United States Patent [19]
Stiehl et al.

[11] Patent Number: 5,862,413
[45] Date of Patent: Jan. 19, 1999

[54] SINGLE-USE CAMERA WITH RETAINER CAP FOR SCROLL OF UNEXPOSED FILM

[75] Inventors: Mark August Stiehl, Rochester; Jude Anthony SanGregory, Spencerport, both of N.Y.

[73] Assignee: Eastman Kodak Company, Rochester, N.Y.

[21] Appl. No.: 662,744

[22] Filed: Jun. 10, 1996

[51] Int. Cl.⁶ .................................................. G03B 17/02
[52] U.S. Cl. ........................... 396/6; 396/440; 396/535; 396/538
[58] Field of Search .............................. 396/6, 439, 440, 396/535, 538; 242/348.2, 580, 588.5

[56] References Cited

U.S. PATENT DOCUMENTS

| | | | |
|---|---|---|---|
| 415,423 | 11/1889 | Smith | 242/580 |
| 2,324,086 | 7/1943 | Hutchison, Jr. | 396/440 |
| 2,417,587 | 3/1947 | Damstra | 242/580 |
| 3,347,142 | 10/1967 | Steisslinger | 95/31 |
| 3,412,662 | 11/1968 | Balalis | 95/11 |
| 3,967,300 | 6/1976 | Oshima | 354/288 |
| 4,100,667 | 7/1978 | Napor et al. | 29/429 |
| 4,226,517 | 10/1980 | Skarman | 396/6 |
| 4,228,579 | 10/1980 | Dunkel et al. | 29/430 |
| 4,884,087 | 11/1989 | Mochida et al. | 354/75 |
| 4,890,130 | 12/1989 | Takei et al. | 354/288 |
| 4,954,857 | 9/1990 | Mochida et al. | 354/75 |
| 4,972,649 | 11/1990 | Mochida et al. | 53/430 |
| 5,016,833 | 5/1991 | Hamlin | 242/66 |
| 5,049,914 | 9/1991 | Dassero | 354/288 |
| 5,235,366 | 8/1993 | Kucmerowski | 354/212 |
| 5,249,753 | 10/1993 | Takahashi et al. | 242/71.1 |
| 5,257,750 | 11/1993 | Wolf et al. | 242/71.1 |
| 5,268,713 | 12/1993 | Kataoka | 396/6 |
| 5,298,930 | 3/1994 | Asakura et al. | 396/535 |

FOREIGN PATENT DOCUMENTS

| | | |
|---|---|---|
| 0 632 314 A2 | 5/1994 | European Pat. Off. |
| 0 743 546 A1 | 11/1996 | European Pat. Off. |
| 51-36935 | 3/1976 | Japan . |
| 52-140321 | 11/1977 | Japan . |
| 58-21248 | 2/1983 | Japan . |
| 59-143841 | 8/1984 | Japan . |
| 2033138 | 7/1988 | Japan . |
| 63-125837 | 8/1988 | Japan . |
| 63-125840 | 8/1988 | Japan . |
| 1-285937 | 11/1989 | Japan . |
| 2-52340 | 2/1990 | Japan . |
| 2-82239 | 3/1990 | Japan . |
| 3-2752 | 1/1991 | Japan . |
| 3-39734 | 2/1991 | Japan . |
| 3-92850 | 4/1991 | Japan . |
| 4226439 | 4/1991 | Japan . |
| 5-72671 | 3/1993 | Japan . |
| 5-134361 | 5/1993 | Japan . |
| 0 587 447 A1 | 9/1993 | Japan . |
| 5-232633 | 9/1993 | Japan . |
| 5-323517 | 12/1993 | Japan . |
| 6-3771 | 1/1994 | Japan . |
| 6-35123 | 2/1994 | Japan . |
| 6-130568 | 5/1994 | Japan . |
| 6-148809 | 5/1994 | Japan . |
| 6-148813 | 5/1994 | Japan . |
| 6-161042 | 6/1994 | Japan . |
| 6-161044 | 6/1994 | Japan . |
| 6-175272 | 6/1994 | Japan . |
| 6-186675 | 7/1994 | Japan . |
| 6-266059 | 9/1994 | Japan . |
| 6-289541 | 10/1994 | Japan . |
| 6-295022 | 10/1994 | Japan . |
| 6-332118 | 12/1994 | Japan . |
| 7-43859 | 2/1995 | Japan . |
| 7-219156 | 8/1995 | Japan . |
| 7-219157 | 8/1995 | Japan . |

*Primary Examiner*—Eddie C. Lee
*Attorney, Agent, or Firm*—Gordon M. Stewart; Charles E. Snee, III

[57] ABSTRACT

A single-use camera includes an external housing (290, 292), within the housing a camera frame (100) having an exposure opening (102), a first chamber (104) on one side of the exposure opening for receiving a light-tight film cartridge (18) enclosing a filmstrip (36); and a second chamber (108) on an opposite side of the exposure opening for receiving a scroll (268) formed from a filmstrip, and a separate retainer cap (80; 210–216; 220–234) located in the second chamber for engaging an end of the scroll to prevent clock-springing of the scroll.

6 Claims, 12 Drawing Sheets

SINGLE-USE CAMERA WITH RETAINER CAP FOR SCROLL OF UNEXPOSED FILM

TECHNICAL FIELD

The invention concerns improvements to single-use cameras and to apparatus and methods for loading film into such cameras. More particularly, the invention concerns such cameras in which a length of filmstrip has been withdrawn from a light-tight cartridge and formed into a scroll of film, after which the cartridge and scroll have been loaded into a frame of the camera.

BACKGROUND OF THE INVENTION

In recent years, so-called single-use or disposable cameras have become popular, such as those disclosed in commonly assigned U.S. Pat. Nos. 4,890,130 and 5,235,366. Such cameras typically include an internal frame molded from a suitable plastic material. Mounted on the internal frame may be various internal camera components such as a thumbwheel for advancing the film, a taking lens and shutter assembly, a viewfinder, and a frame counterwheel, all of whose functions are familiar to those skilled in the camera technologies. The internal frame includes chambers for receiving a light-tight cartridge enclosing a spool to which is attached a trailing end of a filmstrip.

In one known method of loading film into the frame of a single-use camera, such as disclosed in U.S. Pat. No. 4,972,649, the film strip is withdrawn from the cartridge, leaving the trailing end attached to the spool. The withdrawn portion of the filmstrip is then formed into a scroll on a quill. The cartridge is moved axially into a first chamber in the frame, to permit the spool to engage a rotatable coupling mounted on the frame. The scroll is inserted axially or radially into a second chamber in the frame; so that, a length of filmstrip extends between the scroll and the cartridge, after which the quill is withdrawn. In another method, the cartridge and scroll first are mounted in retainers on the back cover of the camera and the quill is withdrawn. The cartridge and scroll then are inserted into their respective chambers when the back cover is assembled to the camera frame. In still another method, the cartridge is installed in a first chamber in the camera frame and the leading end of the filmstrip is threaded across the camera to a take-up spool in a second, opposite chamber. The filmstrip is then wound from the cartridge to the spool by engaging the spool with an external winding quill. In all instances, the user of the camera indexes the film back into the cartridge as pictures are taken.

Although the methods of loading disclosed in U.S. Pat. No. 4,972,649 appear to have been used rather widely, some problems have arisen. Regardless of the loading method used, either the chamber for the scroll must be completely open at one end to allow axial insertion of a scroll of film; or a rather deep, radial notch must be provided in an end wall of the chamber. The radial notch serves first to accommodate a quill during insertion of a scroll or rotation of a spool and then to permit the quill to be withdrawn. The requirement for an open end of the chamber or a notched end wall has limited the camera designer's freedom to place various camera components in that location. When the filmstrip is withdrawn from the cartridge after installation into the camera frame, tedious hand operations or complicated threading mechanisms have been needed to attach a leading end of the filmstrip to the take-up spool. So, a need has arisen for improved apparatus and a method for loading such a camera, without requiring an open-ended or notched-wall chamber for the scroll and without requiring complex techniques for attaching a leading end to a take-up spool.

Single-use cameras recently have become available which use an advanced photographic system (APS) cartridge of a type disclosed in commonly assigned U.S. Pat. No. 5,049,914. The APS cartridge encloses a spool to which a trailing end of a filmstrip is attached. Upon rotation of the spool, the leading end of the film strip is thrust from the cartridge past an open light-lock door. The filmstrip is returned to the cartridge after exposure. During photofinishing, the filmstrip again is thrust from the cartridge for developing and printing, and then returned to the cartridge. Later the customer may desire further photographic prints; so that, the film again must be thrust from the cartridge. Because of this intended repeated use of the cartridge and filmstrip, a need has arisen for apparatus and methods for loading a single-use camera which will ensure that the leading end of the filmstrip will not be damaged during loading. It would be desirable when using APS cartridges to be able to withdraw the filmstrip to form a scroll, in order to avoid using a take-up spool which might increase chances of damaging the leading end.

SUMMARY OF THE INVENTION

A primary objective of this invention is to provide an improved apparatus and method for loading film into a single-use camera.

Another objective of this invention is to provide an improved single-use camera and an improved internal frame for a single-use camera, in which a scroll of film can be installed easily and reliably but with only minimal impact on the surrounding structure of the camera and internal frame.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A single-use camera in accordance with the invention may include an external housing; a camera frame within the housing, the frame having an exposure opening; a first chamber on one side of the exposure opening; within the first chamber, a light-tight film cartridge enclosing a spool to which is attached a trailing end of a filmstrip; the filmstrip extending from the cartridge across the exposure opening; a second chamber on an opposite side of the exposure opening; and within the second chamber, a scroll formed from the filmstrip. In accordance with the invention, such a camera is characterized by a separate retainer cap located in the second chamber and engaged with an end of the scroll, for preventing clock-springing of the scroll.

A retainer cap in accordance with the invention may include a base plate for engaging an end of the second chamber; abutment means supported by the base plate for engaging the end of the scroll to prevent clock-springing; and means for permitting a filmstrip to move past the abutment means during formation of the scroll and operation of the camera. The abutment means may include a curved wall extended outward from the base plate; and the means for permitting may include an opening in the curved wall. Alternatively, the abutment means may include a plurality of curved wall segments extended outward from the base plate; and the means for permitting may include an opening between a pair of the wall segments.

The second chamber of the camera frame may include opposite end walls separated by a distance greater than a combined length of the scroll and the retainer cap and an arcuate wall extending between the opposite end walls, the arcuate wall including a support rail for engaging the scroll near an end of the scroll opposite the retainer cap. The end wall adjacent the retainer cap may include an axially and radially extended recess for receiving a tool used to install the scroll and retainer cap. The end wall opposite the retainer cap may be angled outwardly for receiving a tool used to install the scroll and retainer cap.

A single-use camera in accordance with the invention may include an external housing, within the housing a camera frame having an exposure opening, a first chamber on one side of the exposure opening for receiving a light-tight film cartridge enclosing a filmstrip; and a second chamber on an opposite side of the exposure opening for receiving a scroll formed from a filmstrip. Such a camera may be characterized by a separate retainer cap located in the second chamber for engaging an end of the scroll to prevent clock-springing of the scroll.

In accordance with the invention, a camera frame for use in a single-use camera may have an exposure opening; a first chamber on one side of the exposure opening for receiving a light-tight film cartridge enclosing a filmstrip; a second chamber on an opposite side of the exposure opening for receiving a scroll formed from a filmstrip. Such a camera frame may be characterized by a separate retainer cap located in the second chamber for engaging an end of a scroll to prevent clock-springing of a scroll.

The camera of the invention provides various advantages. The retainer cap holds the scroll securely against clockspringing, until the camera back cover has been installed. The scroll chamber can have solid end walls, which provides a more robust frame for the camera and simplifies lightlock design between the frame and the camera back cover.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

Overall Arrangement and Operation

Figure 1:
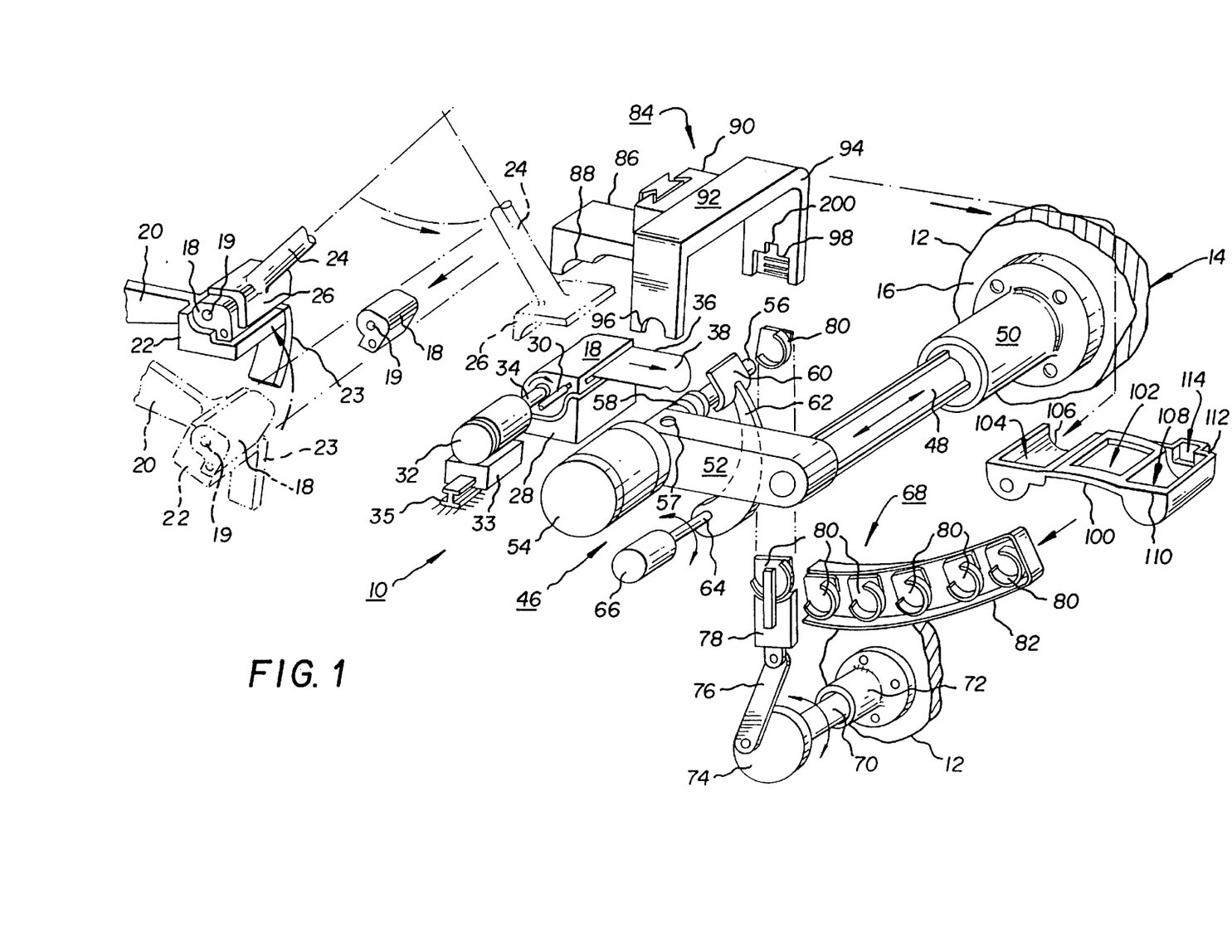
FIG. 1 illustrates a schematic perspective view of an apparatus in accordance with the invention.

FIG. 1 illustrates an overall arrangement of an apparatus 10 for loading a single-use camera frame, in accordance with the invention. A rigid face plate 12, shown only fragmentarily, supports most of the components of the apparatus. A lighted space may be located at a back side 14 of the face plate, while a darkened space may be located at a front side 16; so that, the face plate serves as a wall between such lighted and darkened environments. A light-tight film cartridge 18, such as an APS cartridge, encloses an internal spool 19 having end hubs which are accessible through openings in the cartridge wall, as illustrated schematically. A light-lock door, not illustrated, closes the cartridge in the manner familiar for APS cartridges. Cartridge 18 is passed through face plate 12 via a suitable conduit, not illustrated, and picked up by a first transfer arm 20 having a vacuum gripper 22 for securely holding the cartridge. A keeper plate 23 extends downwardly from gripper 22 to block movement of subsequent cartridges when transfer arm 20 is raised to a position where a second transfer arm 24 can acquire the cartridge using a vacuum gripper 26. Transfer arm 24 is rotated through about ninety degrees to reorient the cartridge for placement on a vacuum nest 28 which holds the cartridge during scrolling.

Once the cartridge has been placed on nest 28, a light-lock door opening tool 30 is advanced into engagement with a hub of the light-lock door and then rotated to open the door. Simultaneously, a thrusting motor 32 having a keyed drive shaft 34 is advanced into engagement with spool 19. When an APS cartridge is used, spool 19 will be locked in a predetermined position within the cartridge; so that, keyed shaft 34 readily engages the spool. Motor 32 and tool 30 may be supported, for example, for reciprocating movement on a slide 33 which is moved on a fixed track 35 by a conventional oscillating actuator, not illustrated. Upon rotation of spool 19, a filmstrip 36 is thrust from the cartridge; so that, its leading end 38 moves toward a scrolling mechanism 46 which will form a scroll of film from a leading portion of the filmstrip. An alternative arrangement for use with a conventional 35 mm cartridge will be discussed with regard to FIGS. 18 and 19.

The scrolling mechanism is supported on a cantilever, splined shaft 48 mounted for axial movement through a linear bearing assembly 50 supported by face plate 12. A conventional oscillating actuator, not illustrated, may be mounted to back side 14 to drive shaft 48 back and forth. Within the darkened environment, shaft 48 supports at its free end a laterally extended arm 52 on which a scrolling motor 54 is mounted. A scrolling quill 56 extends from motor 54 toward face plate 12. An axis of rotation of the scrolling quill extends transverse to, but somewhat below, a plane of movement of filmstrip 36 from cartridge 18. A port 57 for vacuum or pressurized air is provided in arm 52 and is operatively connected to scrolling quill 56 via a conventional rotary union or sliding gland, not illustrated, the union or gland being supported by arm 52. This arrangement provides both vacuum for acquiring leading end 38 at the beginning of scrolling, and pressurized air at the stripping of a completed scroll. A scroll stripping hub or nut 58 is mounted on scrolling quill 56 for rotation therewith, as will be explained in detail with regard to FIGS. 11A and 11B.

On an opposite side of the scrolling quill from nest 28, a scrolling guide shell 60 is mounted on a pivotable arm 62 connected to a drive shaft 64 of a motor 66. A retainer cap delivery mechanism 68 is located beneath the scrolling quill and somewhat closer to face plate 12. A cantilever, rotatable shaft 70 is supported by a bearing assembly 72 supported by face plate 12. At its free end, shaft 70 supports a crank disk 74 pivotably joined to a connecting rod 76. A retainer cap lifter 78 is pivotably joined to connecting rod 76 to receive individual retainer caps 80 from a cap delivery track 82.

Above the scrolling quill, a cartridge and scroll gripping mechanism or tool 84 may be positioned by means such as a conventional programmable robot, not illustrated. Tool 84 may include a frame 86 which supports a vacuum gripper 88 for removing cartridge 18 from nest 28. A slide 90 is attached to frame 86 to support a U-shaped frame 94. One depending leg of frame 94 tapers downwardly to form a fork 96 which can straddle the scrolling quill between stripping hub 58 and guide shell 60. An opposite depending leg of frame 94 supports a vacuum gripper 98 for an end cap 80.

To the right of scrolling mechanism 46, as viewed in FIG. 1, a conventional part handling nest, not illustrated, is used to support an internal camera frame 100 to be loaded with a cartridge and film scroll. Frame 100 includes a central exposure opening or gate 102. On one side of opening 102 is a chamber 104 for receiving cartridge 18 axially through an open end 106. On the opposite side of opening 102 is a chamber 108 for receiving a scroll of film. Chamber 108 has closed opposite ends 110, 112 and an arcuate wall extending between the closed ends. A recess 114 is formed in closed end 112 to receive gripper 98 during installation of a scroll of film.

From the foregoing description and FIG. 1, those skilled in the art will understand the overall operation of the apparatus of the invention. See also FIGS. 10A to 10D. Delivery mechanism 68 lifts one of caps 80 into position in gripper 98, which has been lowered to a position directly opposite the free end of the scrolling quill. Fork 96 straddles the scrolling quill. The scrolling quill is then moved axially into position opposite nest 28. Leading end 38 is thrust or withdrawn from cartridge 18 until it slips over scrolling quill 56 and passes between scrolling guide shell 60 and the scrolling quill. As will be discussed in detail subsequently, the filmstrip passes through an opening in retainer cap 80 as the filmstrip moves to the scrolling quill; so that, one end of a scroll forms within the retainer cap as scrolling proceeds. As the leading end is advanced, scrolling quill 56 is rotated slightly faster than spool 19. Vacuum is applied through the scrolling quill to acquire leading end 38 and cinch it to the scrolling quill. Due to the higher speed of rotation of the scrolling quill, the filmstrip within cartridge 18 will be drawn tighter around spool 19, thus developing tension in the film strip between spool 19 and scrolling quill 56. Motor 32 applies a braking torque to help maintain tension in the film, but the torque applied by motor 54 essentially determines the magnitude of the tension in the filmstrip. By monitoring the speed of motor 32, proper cinching of the filmstrip to the scrolling quill can be determined. A vacuum sensor also can be provided to sense the level of vacuum developed at port 57 as winding begins, a substantial drop in pressure being an indication that cinching has occurred.

When proper cinching has occurred, guide shell 60 is moved away from the scrolling quill and motor 54 continues to rotate until a scroll of the desired diameter has been formed. In a conventional manner, a sensor, not illustrated, may be provided for counting edge perforations along one edge of the film strip to monitor the number of frames withdrawn from the cartridge. When the passage of the last frame is sensed, an end-of-scroll perforation on the opposite edge may be sensed by a further sensor, also not illustrated, to indicate completion of a scroll. Rotation of spool 19 and scrolling quill 56 then is stopped. The vacuum applied to the scrolling quill is released and a flow of pressurized air is admitted into the center of the scroll to release the scroll from the quill; so that, the scroll is free to clockspring outwardly into firmer engagement with retainer cap 80. At the same time, motor 54 reverses direction momentarily to provide further assurance that leading end 38 releases from the scrolling quill. The scroll is held securely between fork 96 and a retainer cap held in gripper 98. Scrolling quill 56 then is withdrawn from the scroll.

To transfer the cartridge and scroll to the camera frame, gripper 88 is actuated to acquire cartridge 18 from nest 28. Gripper 92 is raised along slide 90 to move the scroll above the level of the cartridge. Gripping mechanism 84 is then lifted away from scrolling mechanism 46 and toward camera frame 100. At the camera frame, cartridge 18 is slipped axially into chamber 104, to enable spool 19 to engage with a film indexing mechanism supported by the camera frame, not illustrated. Once the cartridge is in place, gripper 92 is lowered to place the completed scroll into chamber 108. In a loaded camera frame, a length of filmstrip 36 extends from cartridge 18 across opening 102 to the completed scroll.

Cartridge and Scroll Gripping Tool or Mechanism

Figure 2:
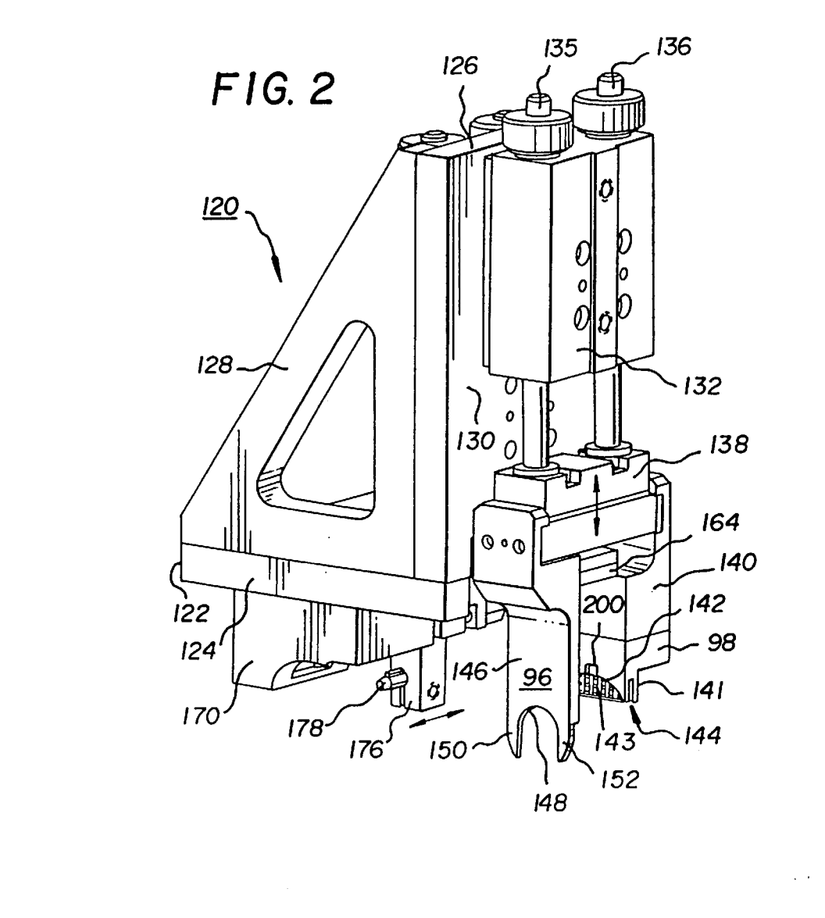
FIG. 2 illustrates a front perspective view of a cartridge and film scroll gripping mechanism in accordance with the invention.
Figure 3:
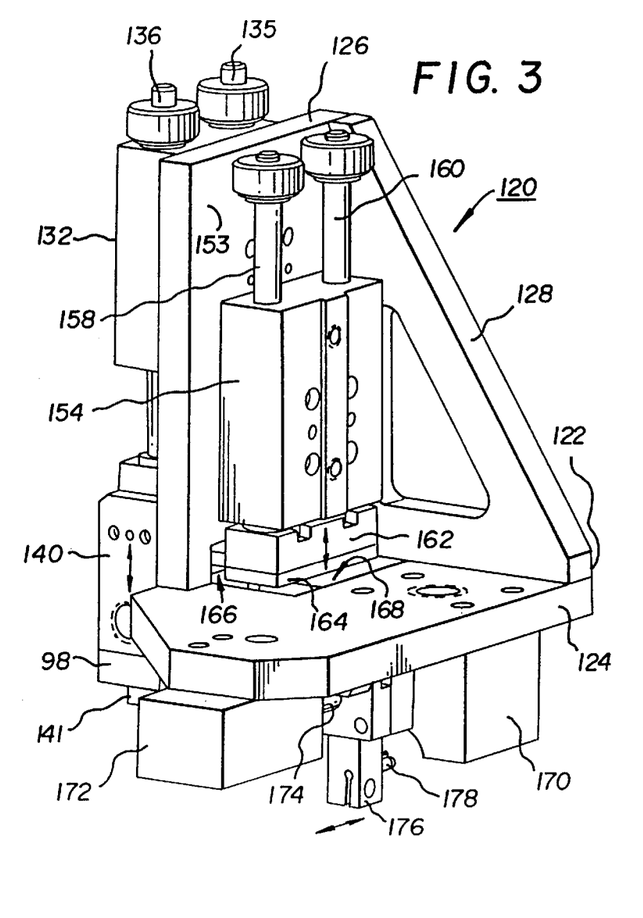
FIG. 3 illustrates a rear perspective view of the mechanism of FIG. 2.

While FIG. 1 illustrates schematically a gripping mechanism 84, FIGS. 2 and 3 illustrate an actual embodiment of a gripping tool or mechanism 120. An L-shaped frame 122 includes a bottom plate 124 and an actuator support plate 126. A side plate 128 extends between plates 124, 126 to provide rigidity. On a front side 130 of support plate 126 is mounted a linear actuator 132 having a pair of actuator rods 135, 136. A gripper support plate 138 is attached to the lower ends of the actuator rods. Fixedly attached to support plate 138 is a depending leg 140 for supporting vacuum gripper 98. As best seen in FIG. 2, gripper 98 includes a narrow, downward extension 141 having an arcuate recess 142 for engaging a retainer cap 80. The back wall of recess 142 includes an array of conventional ports 143 for applying vacuum to a retainer cap. A transverse slot 144 is provided in extension 141 to engage a base plate of a retainer cap of the type shown in FIGS. 6 to 8. Fixedly attached to support plate 138 opposite depending leg 140 is a depending leg 146 for supporting fork 96. Also as seen in FIG. 2, fork 96 includes a semi-circular opening 148 flanked by thin tines 150, 152 for closely engaging scrolling quill 56 during scrolling. When actuator 132 is operated, rods 135, 136 raise or lower fork 96 and vacuum gripper 98.

On a back side 153 of support plate 126 is mounted a linear actuator 154 having a pair of actuator rods 158, 160. A stripper support plate 162 is attached to the lower ends of the actuator rods and a stripper plate 164 is attached to plate 162. As seen in FIG. 3, an opening 166 is provided through support plate 126; and an opening 168 is provided through bottom plate 124. Stripper plate 164 extends through opening 166 between legs 140, 146. When actuator 154 is operated, rods 158, 160 raise or lower support plate 162 and stripper plate 164 through opening 168.

Beneath bottom plate 124, a vacuum gripper 170 is mounted for lifting cartridge 18 from nest 28. Adjacent to gripper 170, in a position which is opposite motor 32 and shaft 34 in the arrangement of FIG. 1, is mounted a linear actuator 172 having an output shaft 174 on which is mounted a depending tool support 176. A splined stub shaft 178 is held by tool support 176 in a position axially aligned with spool 19 when gripper 170 is engaged with cartridge 18 at nest 28. When a scroll has been completed, spool 19 will stop rotating at a predetermined orientation. Actuator 172 is operated to extend shaft 174 and bring splined shaft 178 into engagement with spool 19 to prevent rotation of the spool during transfer for loading into camera frame 100.

Figure 4:
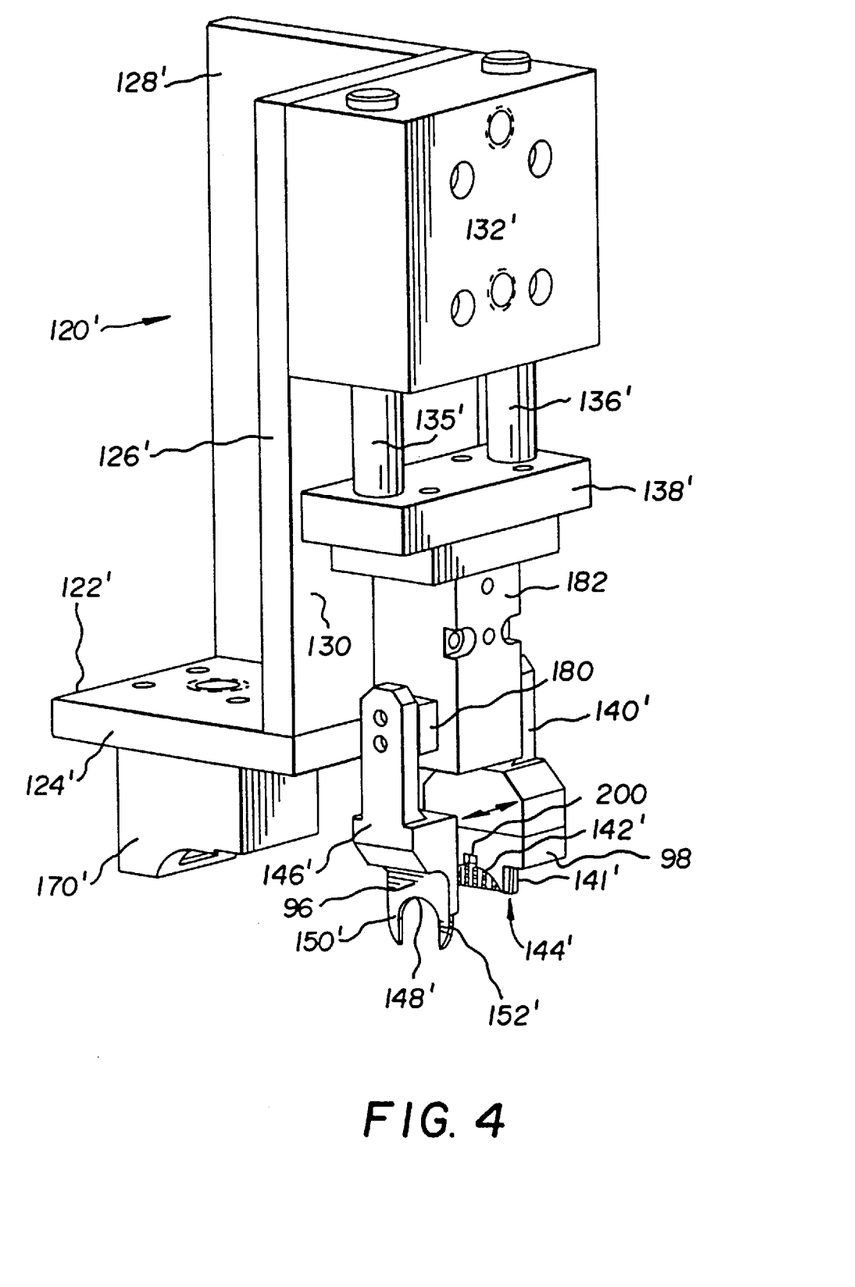
FIG. 4 illustrates schematically a front perspective view of an alternative cartridge and film scroll gripping mechanism.

An alternative gripping tool or mechanism 120' is illustrated in FIG. 4. In this embodiment, components functionally similar to those of the embodiment of FIGS. 2 and 3 are indicated by the same reference numerals, with primes; so, these components will not be further described. Rather than being fixedly mounted to support plate 138', depending legs 140', 146' are supported by a double acting linear actuator 180 mounted in a tool head 182 attached to an under surface of support plate 138'. When actuator 180 is operated, fork 96 and vacuum gripper move toward or away from each other to grip or release a scroll formed on scrolling quill 56. In use of tool 120', a retainer cap 80 would be placed in vacuum gripper 98 before the tool is lowered into engagement with the scrolling quill.

Retainer Cap Delivery Mechanism

Figure 5:
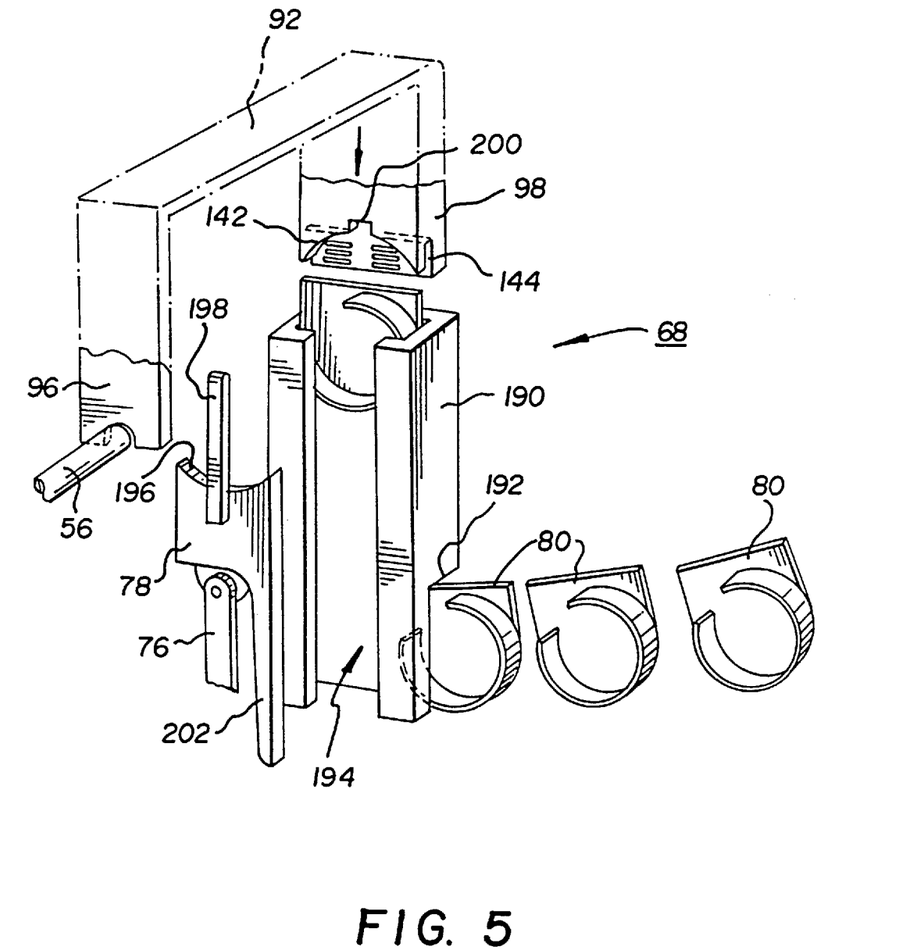
FIG. 5 illustrates a schematic perspective view of a loading mechanism for scroll retainer caps in accordance with the invention.

As shown schematically in FIG. 5, delivery mechanism 68 may include a cap delivery channel 190 having a central passage sized to closely guide one of caps 80. At a lower portion of channel 190 is provided an opening or slot 192 to receive caps 80 from track 82. Cap lifter 78 is slidably mounted within channel 190 and may be provided with an arcuate upper surface 196 to engage a retainer cap. A pilot finger 198 extends upwardly from lifter 78 to engage an recess 200 provided at an upper portion of recess 142 in vacuum gripper 98. A keeper finger 202 extends downwardly from lifter 78 to block slot 192 when the lifter has been raised to place a retainer cap in recess 142. In operation, rotation of crank plate 74 causes lifter 78 to reciprocate up and down channel 190, picking up a retainer cap at each downward movement and delivering a cap at each upward movement.

Figure 6:
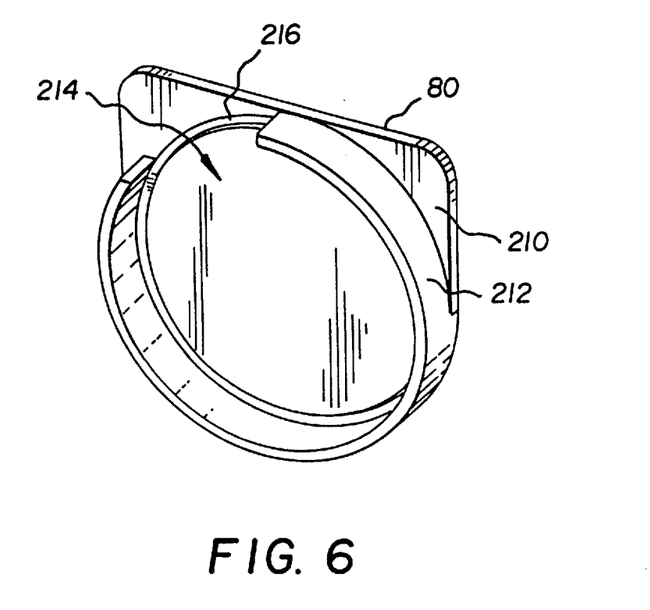
FIG. 6 illustrates a perspective view of one embodiment of a scroll retainer cap in accordance with the invention.
Figure 7:
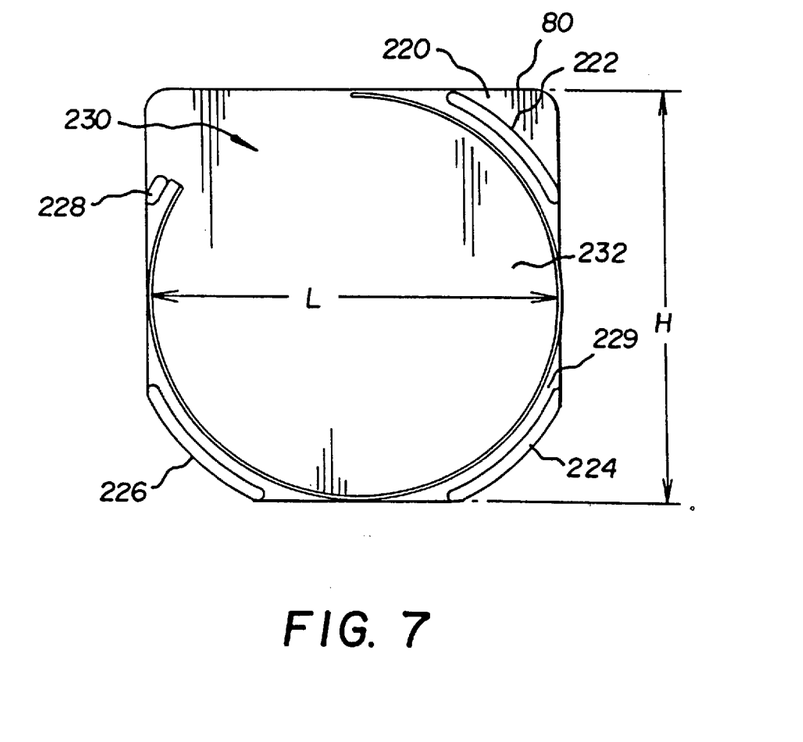
FIG. 7 illustrates an elevation view of another embodiment of a scroll end cap in accordance with the invention.
Figure 8:
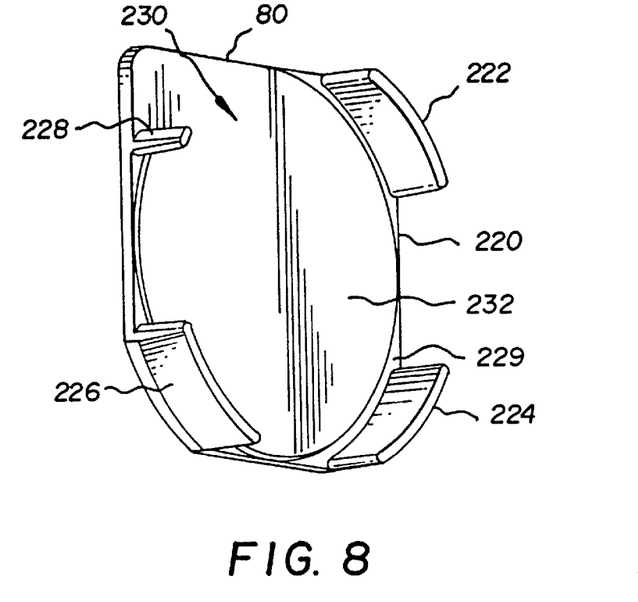
FIG. 8 illustrates a perspective view of the scroll end cap of FIG. 7.

FIGS. 6 to 8 illustrate two embodiments of retainer cap 80. In the embodiment of FIG. 6, an essentially flat base plate 210 supports a curved, preferably circular, cylindrical, abutment wall 212. The inside diameter of wall 212 determines the maximum permissible diameter for a scroll. The perimeter of plate 210 is shaped to match precisely that of end wall 112 in camera frame 100. Thus, the fit between plate 120 and end wall 112 ensures that cap 80 will be removable from, but fixed against rotation within, chamber 108. Abutment wall 212 is broken by an opening 214 in its upper left quadrant, so that filmstrip 36 can pass from cartridge 18 to scrolling quill 56 without contacting the retainer cap. A circular groove 216 is provided in base plate 210, just inside the abutment wall, to provide extra space for a final convolution of film strip to be wound onto a scroll.

In the embodiment of FIGS. 7 and 8, an essentially flat base plate 220 also has a perimeter shaped to match that of end wall 112. In this instance, however, continuous abutment wall 212 has been replaced by curved wall segments 222, 224, 226, 228 whose inside radii determine the maximum permissible diameter for a scroll. Segments 222, 224 and 226 are set at about ninety degrees from each other and each extends over an arc of about forty degrees. Segment 228 extends over an arc of only a few degrees, to allow for an opening 230 through which filmstrip 36 can pass. A circumferentially extended recess 229 is provided inside the wall segments, to provide extra space for a final convolution of filmstrip. Both the length L and the height H of base plate 220 are equal to the maximum diameter of a scroll which can fit into chamber 108. Thus, a scroll of maximum diameter can extend through the openings between the wall segments; so that, this embodiment of retainer cap 80 takes up a minimal volume within chamber 108. A central, circular portion 232 is provided to engage the end of a scroll.

Details of Scrolling Mechanism

Figure 9:
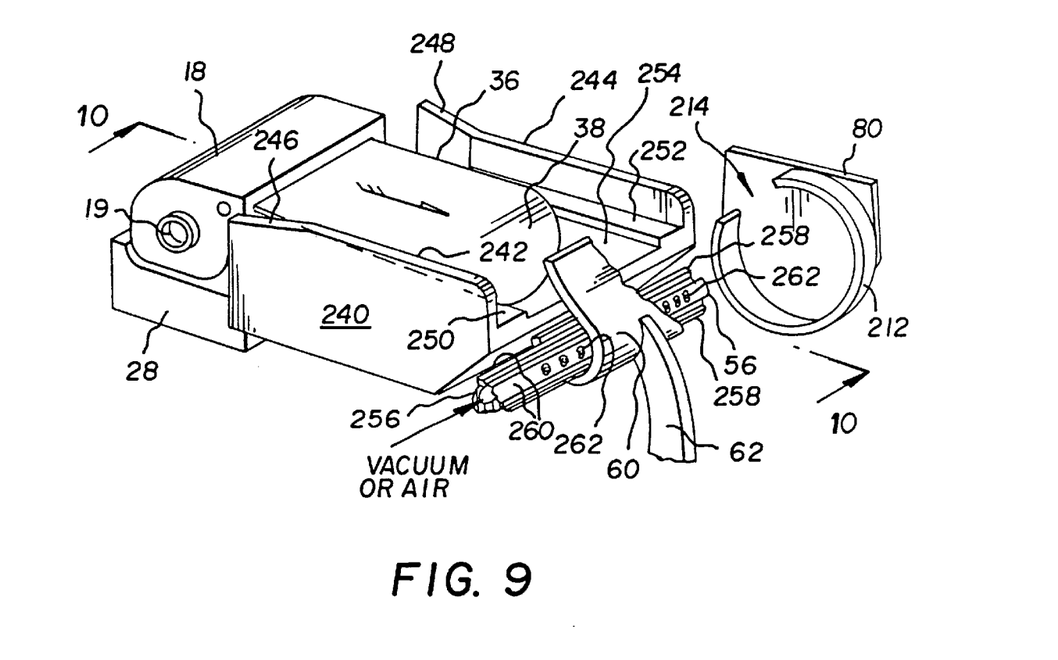
FIG. 9 illustrates a fragmentary perspective view of a film scrolling mechanism included in the apparatus of FIG. 1.

FIG. 9 illustrates various details of one embodiment of scrolling mechanism 46. A filmstrip guide track 240 preferably is provided between nest 28 and scrolling quill 56 to ensure that the filmstrip is delivered precisely for scrolling. Track 240 includes a pair of side walls 242, 244 separated by a distance slightly greater than the transverse width of the filmstrip. Flared inlet portions 246, 248 are provided on the side walls to allow for some misalignment with the nest. To prevent scratching the central image area of the filmstrip, a pair of edge rails 250, 252 are provided for supporting the filmstrip, one rail on each side of a central image relief slot 254.

Figure 10A:
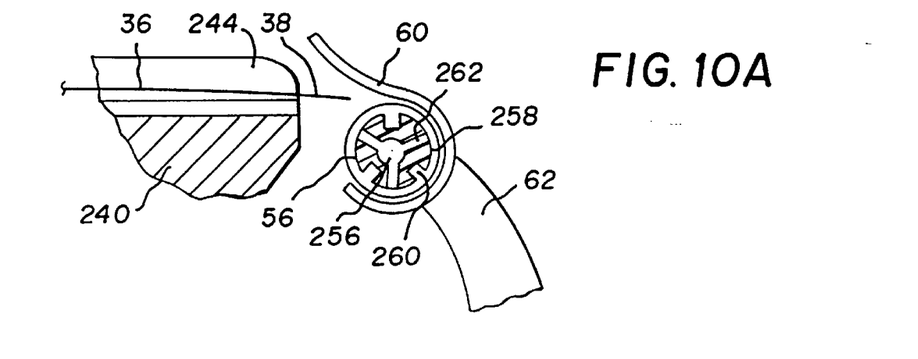
FIGS. 10A, 10B, 10C and 10D illustrate fragmentary elevation views of the mechanism of FIG. 9 at successive stages of scrolling.
Figures 10B, 10C:
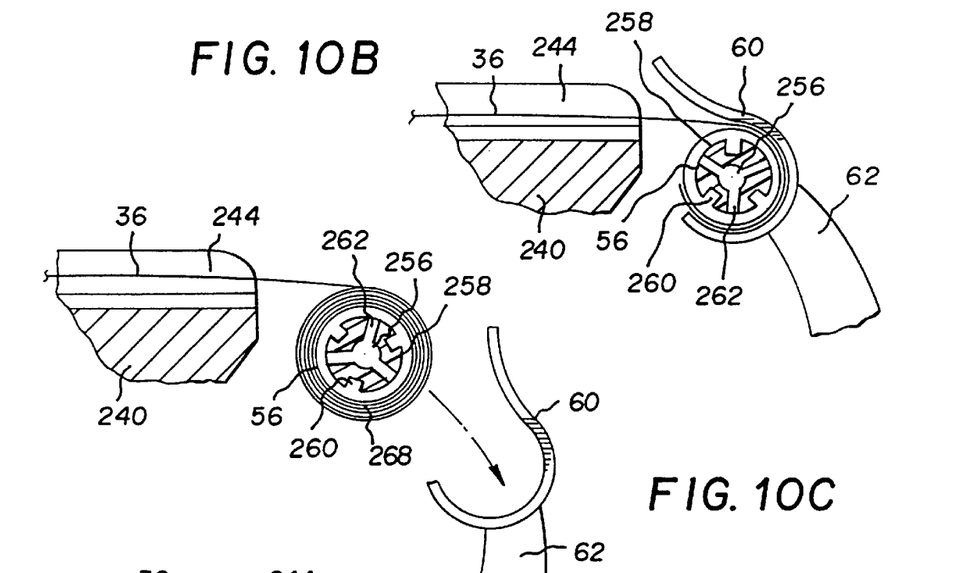
Figure 10D:
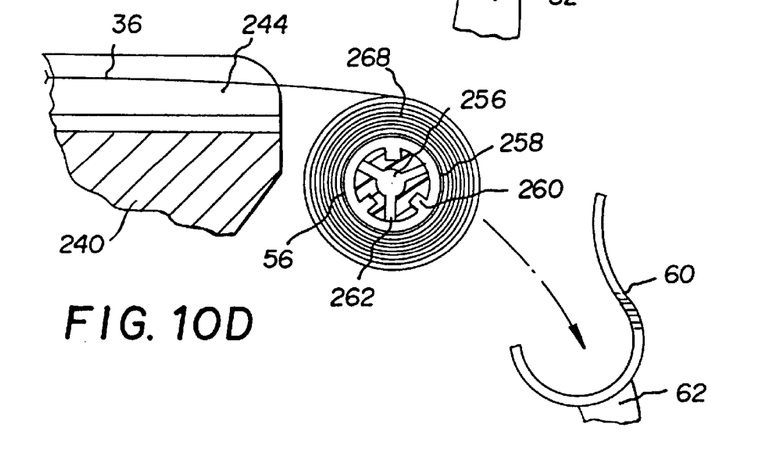

Scrolling quill 56 includes a central hollow core 256 through which vacuum or pressurized air may be applied via port 57. Extending radially outwardly from the core are a plurality of longitudinally extended support lands 258, three as illustrated, separated by longitudinally extended grooves 260. At the outer surface of each land, a row of ports 262 communicates with the hollow core. As shown in FIG. 10A, scrolling begins with guide shell 60 closely engaged with the rotating scrolling quill. Vacuum is applied through ports 262 to bring leading end 38 into close contact with the scrolling quill, as shown in FIG. 10B. When the filmstrip has cinched to the scrolling quill, a scroll 268 begins to grow, necessitating removal of guide shell 60 after a few convolutions, as shown in FIG. 10C. Rotation of the scrolling quill is stopped when a desired scroll diameter is reached.

Figures 11A, 11B:
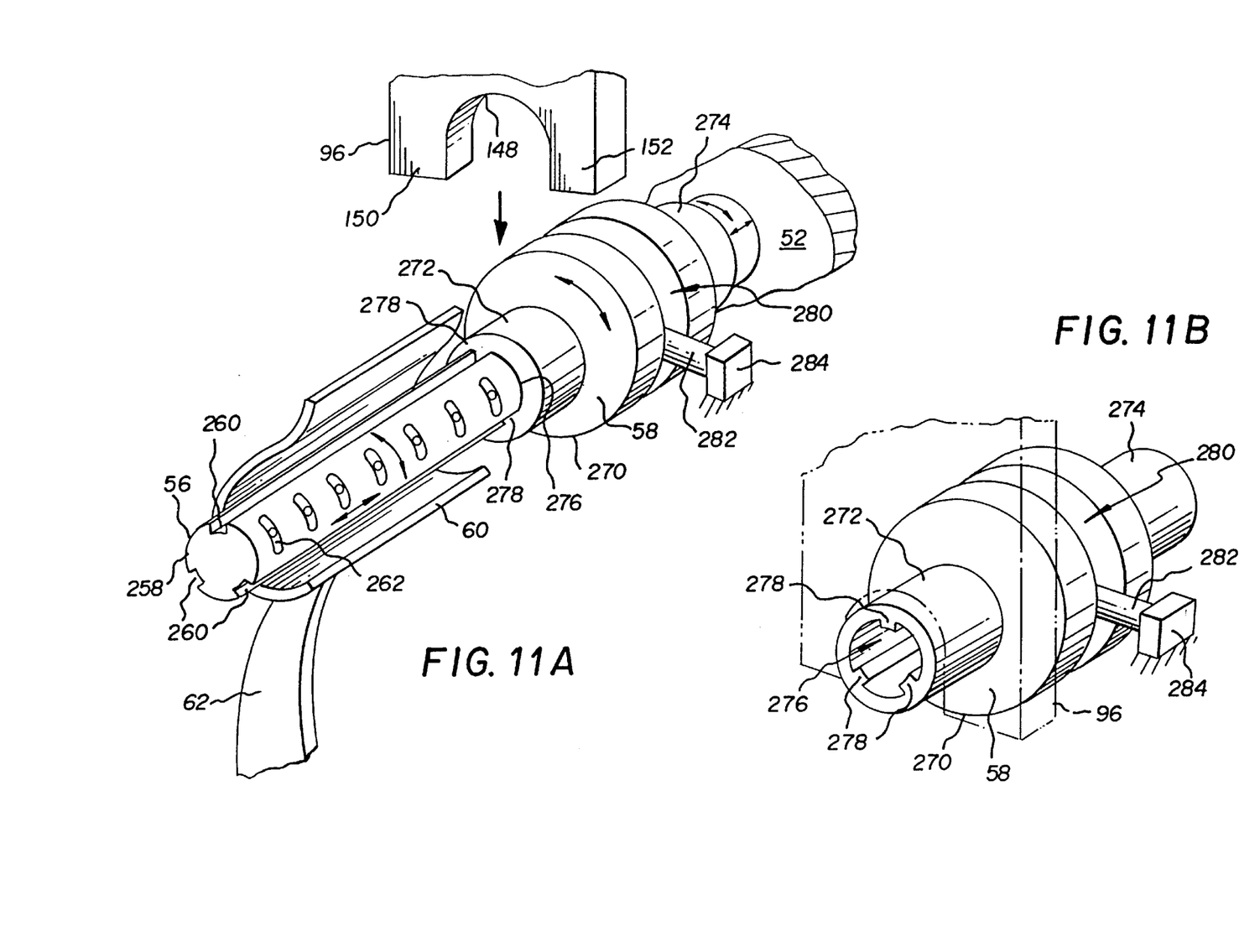
FIGS. 11A and 11B illustrate fragmentary perspective views of a vacuum actuated film scrolling quill included in the mechanism of FIG. 9, with the quill in respective extended and retracted positions.
Figure 12:
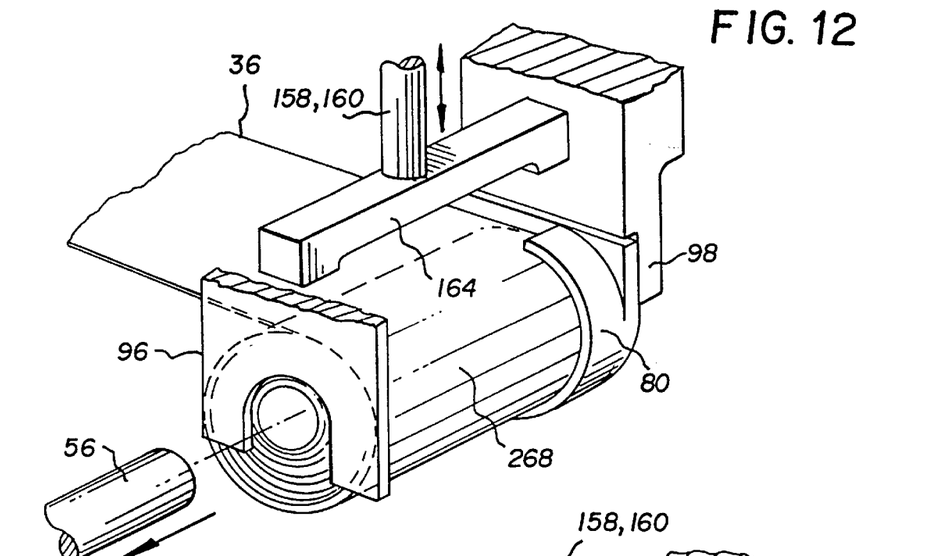
FIG. 12 illustrates a fragmentary schematic view of the mechanism of FIGS. 2 and 3, with a film scroll gripped by the mechanism and a scrolling quill retracted from the film scroll.

FIGS. 11A and 11B illustrate details for the scrolling mechanism which cooperate to strip a scroll from the scrolling quill. Stripping hub or nut 58 comprises a central cylindrical body 270 having axial extensions 272, 274 of smaller diameter. An axial bore 276 extends through body 270, bore 276 being configured to complement the external geometry of scrolling quill 56. Thus, bore 276 includes a plurality of radially inwardly extended stripping fingers 278, three as illustrated, which extend into grooves 260 on the scrolling quill. Body 270 also includes an external, circumferential groove 280. To prevent hub 58 from moving axially when the scrolling quill is withdrawn, a retaining probe 282 extends from a fixed attachment block 284 into groove 280.

When a scroll has been formed, the scrolling quill is stopped. Vacuum acting in bore 256 is released and the scrolling quill is reverse rotated through an arc of about five to ten degrees while pressurized air is directed through ports 262. The scroll thus is released from the quill to enable the scroll to clockspring outward into full contact with its associated retainer cap. The scrolling quill then is withdrawn through hub 58, which held stationary by probe 282. As the scrolling quill moves through the scroll, stripping fingers 278 engage the inner convolutions of the filmstrip to prevent telescoping of the scroll. As indicated in FIG. 11B, fork 96 also prevents telescoping of outer convolutions of the scroll.

Improved Single-Use Camera

Figure 13:
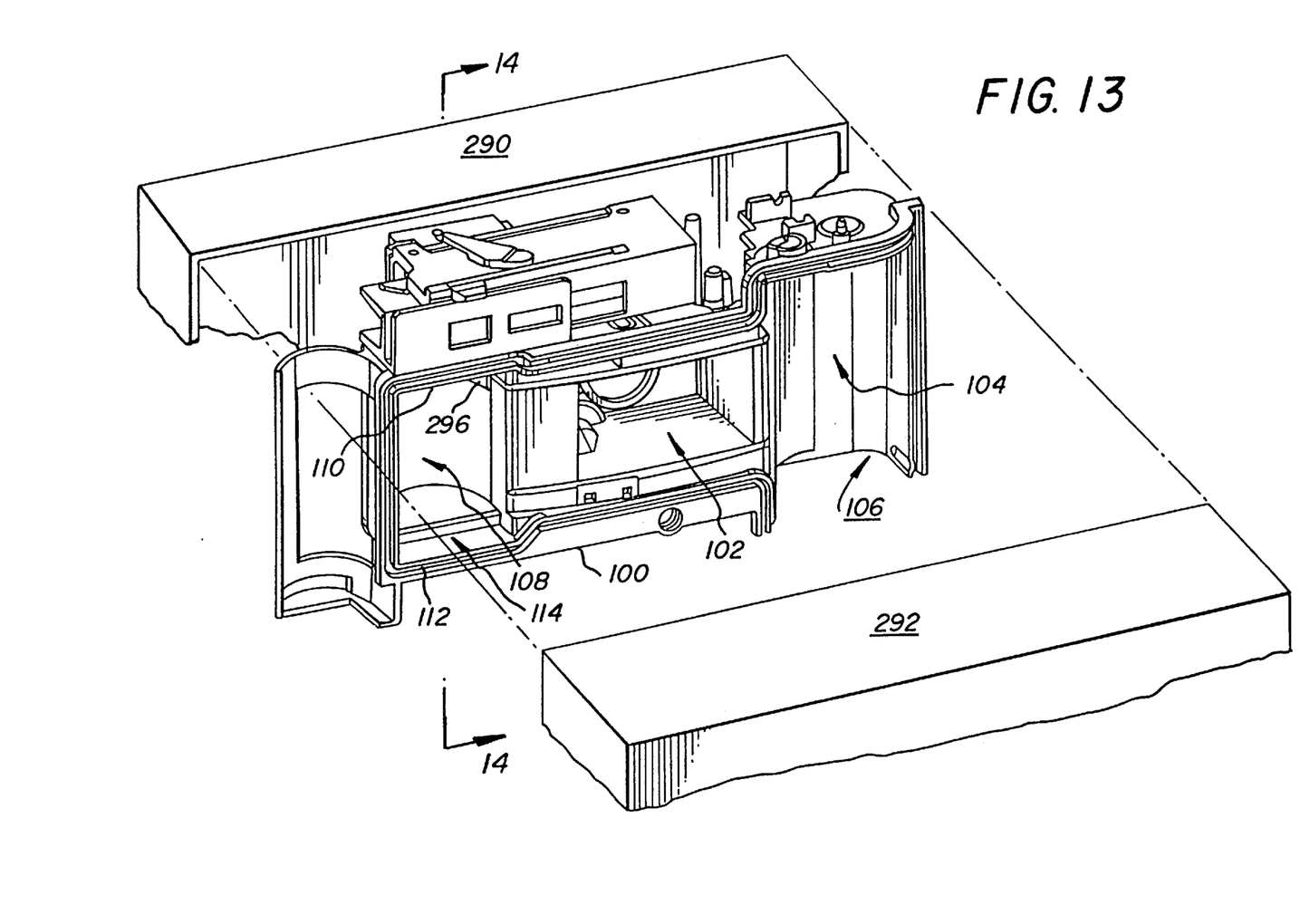
FIG. 13 illustrates an exploded perspective view of a single-use camera having an interior frame which can be loaded in accordance with the invention.

As shown in FIG. 13, a camera incorporating internal frame 100 may include a front cover portion 290 into which the frame is nested at assembly. In some cameras, cover portion 290 and frame 100 may be formed as a single unit. Frame 100 may include various conventional single-use camera components, such as a taking lens, shutter mechanism, film winding mechanism, and viewfinder housing, none of which is illustrated. A back cover portion 292 also may be included to complete a light-tight housing for the camera.

Figure 14:
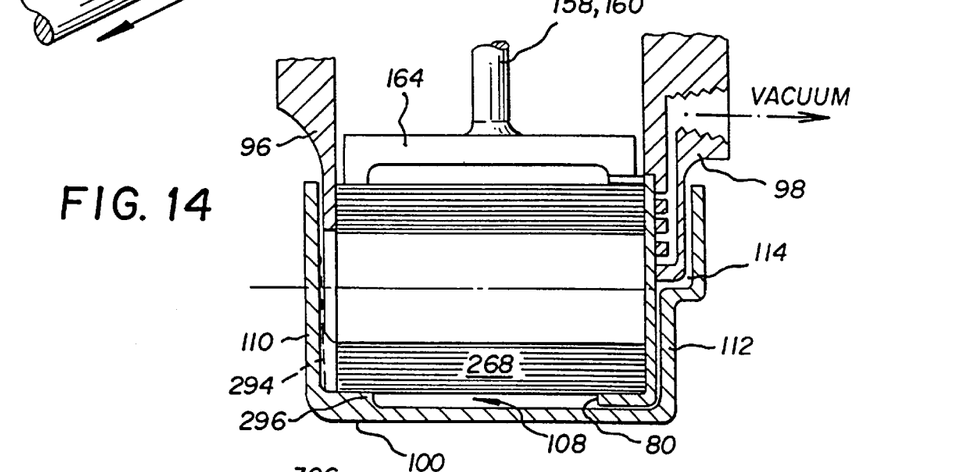
FIG. 14 illustrates a section view along line 14—14 of FIG. 13, with a film scroll in place within the camera frame and the gripping mechanism of FIGS. 2 and 3 ready to be retracted.

FIG. 14 illustrates schematically how scroll 268 fits within chamber 108. Vacuum gripper 98 slips into recess 114 and fork 96 fits into a clearance space next to end wall 110. The clearance space may be provided by angling wall 110 slightly outward, as indicated in dashed line at 294. A support rail 296 may be provided near end wall 110 to support scroll 268 near end wall 110. When the scroll and retainer cap have been seated within chamber 108, stripper plate 164 is lowered into contact with the scroll and retainer cap to hold them in place while fork 96 and gripper 98 are retracted in the manner previously described.

Alternative Mechanism for Cinching Filmstrip to Scrolling Quill

Figure 15:
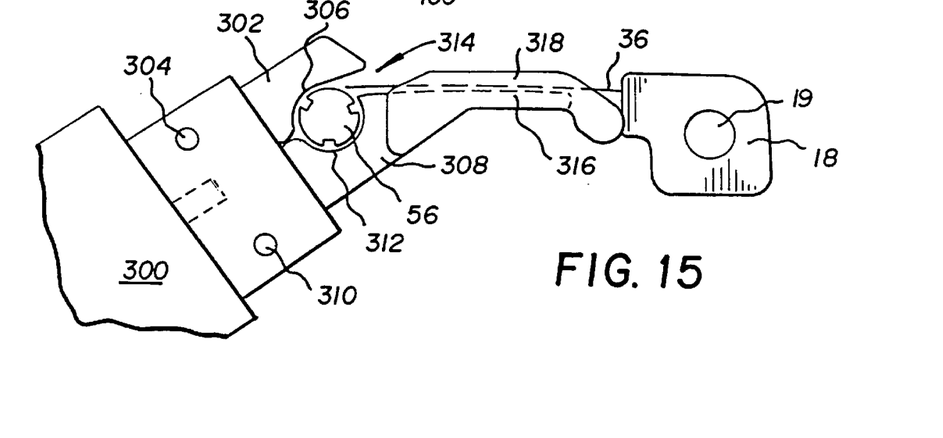
FIG. 15 illustrates schematically a back elevation view of an alternative mechanism for cinching a film strip onto a scrolling quill.
Figures 16, 17:
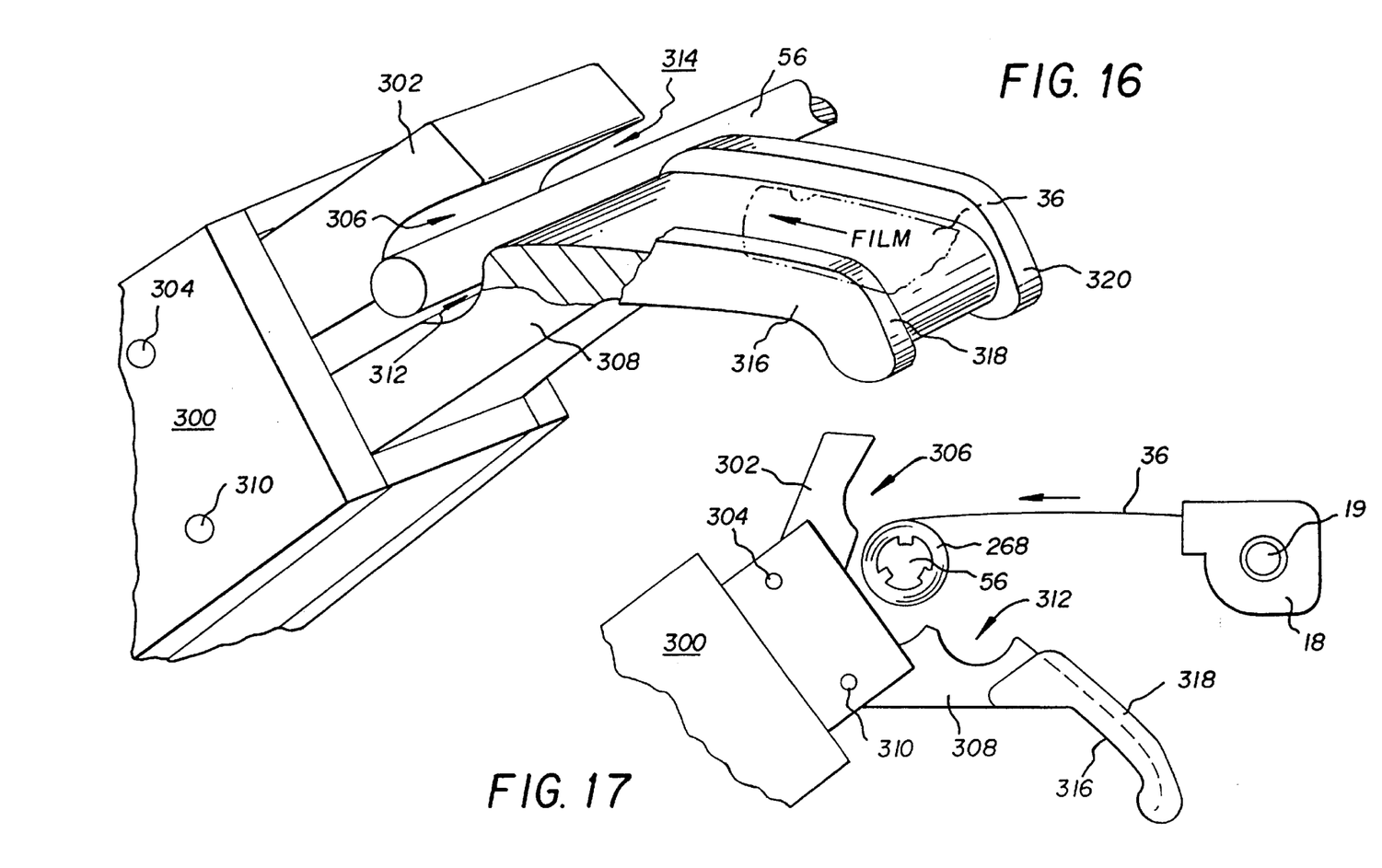
FIG. 16 illustrates schematically a fragmentary back perspective view of the mechanism of FIG. 15.
FIG. 17 illustrates schematically the mechanism of FIGS. 15 and 16 in an open position.

FIGS. 15 to 17 illustrate an alternative to scrolling guide shell 60 for use during cinching of the filmstrip to the scrolling quill. A rotary actuator 300 is supported by face plate 12 below the scrolling quill. An upper scrolling guide member or shell 302 is mounted on a pivot 304. Guide member 302 includes a partially cylindrical, elongated recess 306 for closely engaging an upper portion of the scrolling quill. Below guide member 302, a lower scrolling guide member or shell 308 is mounted on a pivot 310. Guide member 308 includes a partially cylindrical, elongated recess 312 for closely engaging a lower portion of the scrolling quill. An entrance slot 314 is defined between outer ends of members 302, 308 in the closed position of FIGS. 15 and 16. A filmstrip guide track 316 having side walls 318, 320 may be supported by guide member 308 for movement into and out of registration with cartridge 18. As will be understood by those skilled in the art, a suitable gear train may be provided between actuator 300 and guide members 302, 308, for pivoting the guide members. In use, filmstrip 36 is thrust through entrance slot 314 into a clearance space between recesses 306, 312 and the scrolling quill. Improved engagement with the scrolling quill is provided, compared to guide shell 60, due to the increased length of the close clearance space. Once the scroll has begun to build in the manner previously described, actuator 300 is operated to pivot the guide members to the position of FIG. 17 for completion of the scrolling.

Figure 18:
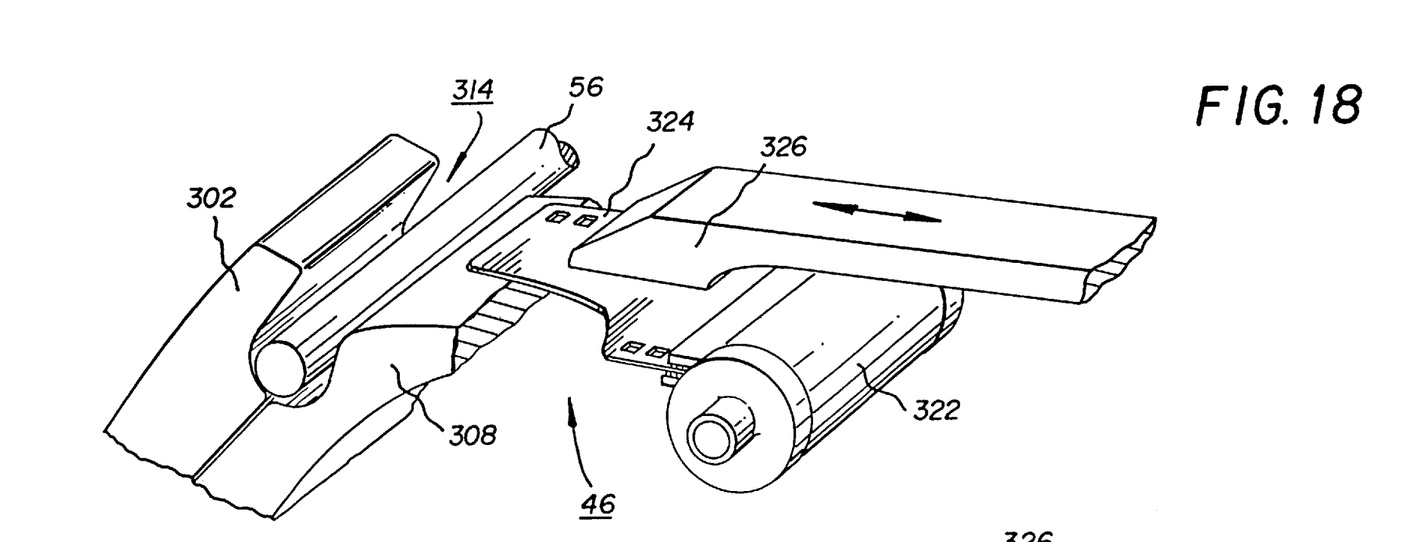
FIG. 18 illustrates schematically a fragmentary back perspective view of an mechanism for cinching a leading end of a film strip from a conventional 35 mm cartridge.
Figure 19:
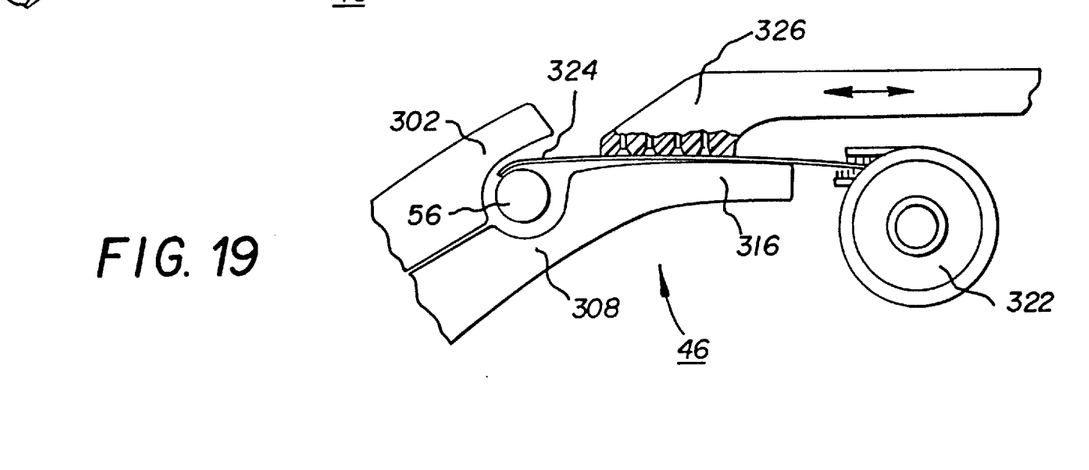
FIG. 19 illustrates schematically a back elevation view of the mechanism of FIG. 18 with the leading end inserted into the cinching mechanism.

FIGS. 18 and 19 illustrate an alternative arrangement of scrolling mechanism 46, for use with a conventional 35 mm cartridge 322. In the well-known manner, the filmstrip within such cartridges is provided with a leading end 324 which projects outward from the cartridge through a plush light-lock. The trailing end of the filmstrip is attached to a spool within the cartridge. To engage leading end 324 with scrolling quill 56, a vacuum gripper 326 is provided which can be moved back and forth by a reciprocating mechanism, not illustrated. In use, cartridge 322 would be placed in nest 28 in essentially the manner previously described. Gripper 326 would then be engaged with leading end 324 and moved toward the winding quill to insert the leading end through slot 314. If necessary, gripper 326 could release the leading end, retract, again engage the leading end, and again move toward the winding quill to insert an additional portion of the filmstrip into engagement with the scrolling quill. The apparatus then would complete formation of a scroll and loading of a single-use camera in essentially the same manner as previously described with regard to an APS cartridge.

Parts List 10 apparatus for loading a single-use camera
12 face plate
14 back side of 12 in lighted space
16 front side of 12 in darkened space
18 light-tight film cartridge
19 spool within 18
20 first transfer arm
22 vacuum gripper on 20
24 second transfer arm
26 vacuum gripper on 24
28 nest to hold 18 during scrolling
30 light-lock door opening tool
32 motor
33 slide
34 drive shaft of 32 to engage 19
35 track
36 filmstrip
38 leading end
46 scrolling mechanism
48 splined shaft
50 linear bearing assembly
52 lateral arm
54 scrolling motor
56 scrolling quill
57 port for vacuum or pressurized air
58 stripping hub or nut
60 scrolling guide member or shell
62 pivotable arm
64 shaft
66 motor
68 retainer cap delivery mechanism
70 oscillatable shaft
72 bearing assembly
74 crank disk
76 connecting rod
78 lifter for retainer cap

Parts List 80 retainer cap
82 delivery track for 80
84 cartridge and scroll gripping mechanism or tool
86 frame
88 vacuum gripper for 18
90 slide
92 gripper
94 U-shaped frame
96 fork
98 vacuum gripper for 80
100 internal camera frame
102 central exposure opening in 100
104 chamber for receiving 18
106 open end of 104
108 chamber for receiving a scroll of film
110, 112 closed ends of 108
114 recess in 112 to receive 98
120 robotically supported tool for installing 18 and scroll into 100
122, 122' L-shaped frame
124, 124' bottom plate
126, 126' actuator support
128, 128' side plate
130 front side of 126
132, 132' linear actuator
135, 135'; 136, 136' actuator rods
138, 138' gripper support plate
140, 140' depending leg supporting 98
141, 141' narrow extension to fit 114
142, 142' arcuate recess to engage
143 array of vacuum ports
144, 144' transverse slot to engage base plate of 80
146 depending leg supporting 96
148, 148' opening to engage 56
150, 150'; 152, 152' thin tines to engage scroll end
153 back side of 126
154 linear actuator
158, 160 actuator rods
162 stripper support plate
164 stripper plate
166 opening in 126
168 opening in 124
170, 170' vacuum gripper for 18
172 linear actuator
174 shaft
176 depending tool support
178 stub shaft to engage 19
180 linear actuator
182 tool head
190 cap delivery channel
192 opening to receive 80 from 82
194 longitudinal slot
196 arcuate surface
198 pilot finger
200 recess in 98 for 198
202 keeper finger
210 base plate of 80
212 arcuate abutment
214 opening to pass 36
216 arcular groove
220 base plate
222, 224, 226, 228 curved wall segments
229 recess inside 222–228
230 opening to pass 36
232 central raised portion on 220
L length of 220
H height of 220
240 film strip guide track
242, 244 side walls
246, 248 flared inlet portions
250, 252 edge rails
254 image relief slot
256 central hollow core
258 radially extended support lands
260 grooves between 258
262 ports for vacuum or air
268 scroll
270 cylindrical body
272, 274 axial extensions

Parts List 276 axial bore
278 radial stripping fingers
280 circumferential groove
282 retaining probe
284 grounded attachment
290 front cover portion
292 back cover portion
294 outwardly angled wall
296 support rail
300 rotary actuator
302 upper scrolling guide member or shell
304 pivot for 302
306 partially cylindrical recess in 302
308 lower scrolling guide member or shell
310 pivot
312 partially cylindrical recess in 308
314 entrance slot between 302 and 308
316 film strip guide track
318, 320 side walls of 316
322 conventional 35 mm cartridge
324 leading end extended from 322
326 vacuum gripper While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A single-use camera including an external housing; a camera frame within the housing, the frame having an exposure opening; a first chamber on one side of the exposure opening; within the first chamber, a light-tight film cartridge enclosing a spool to which is attached a trailing end of a filmstrip: the filmstrip extending from the cartridge across the exposure opening; a second chamber on an opposite side of the exposure opening; and within the second chamber, a scroll formed from the filmstrip, is characterized by:

a removable retainer cap located and fixed against rotation in the second chamber and engaged with an end of the scroll, for preventing clock-springing of the scroll, wherein the retainer cap comprises:

a base for engaging an end of the second chamber;

abutment means supported by the base plate for engaging the end of the scroll to prevent clock-springing; and         means for permitting a filmstrip to move past the abutment means during formation of the scroll and operation of the camera;

wherein the abutment means comprises a curved wall extended outward from the base; and the means for permitting comprises an opening in the curved wall.

2. A single-use camera including an external housing; a camera frame within the housing, the frame having an exposure opening; a first chamber on one side of the exposure opening; within the first chamber, a light-tight film cartridge enclosing a spool to which is attached a trailing end of a filmstrip; the filmstrip extending from the cartridge across the exposure opening; a second chamber on an opposite side of the exposure opening; and seated within the second chamber, a scroll formed from the filmstrip, is characterized by:

a removable retainer cap located and fixed against rotation in the second chamber and engaged with an end of the scroll, for preventing clock-springing of the scroll;

wherein the retainer cap comprises:
   a base for engaging an end of the second chamber;
   abutment means supported by the base plate for engaging the end of the scroll to prevent clock-springing; and means for permitting a filmstrip to move past the abutment means during formation of the scroll and operation of the camera;
   and wherein the abutment means comprises a plurality of segments extended outward from the base; and the means for permitting comprises an opening between a pair of the segments.

3. A single-use camera including an external housing; a camera frame within the housing, the frame having an exposure opening; a first chamber on one side of the exposure opening; within the first chamber, a light-tight film cartridge enclosing a spool to which is attached a trailing end of a filmstrip; the filmstrip extending from the cartridge across the exposure opening; a second chamber on an opposite side of the exposure opening; and within the second chamber, a scroll formed from the filmstrip, is characterized by:
   a removable retainer cap located and fixed against rotation in the second chamber and engaged with an end of the scroll, for preventing clock-springing of the scroll, wherein the retainer cap comprises:
   a base for engaging an end of the second chamber;
   abutment means supported by the base plate for engaging the end of the scroll to prevent clock-springing; and
   means for permitting a filmstrip to move past the abutment means during formation of the scroll and operation of the camera;
   the camera further characterized in that the second chamber includes opposite end walls separated by a distance greater than a combined length of the scroll and the retainer cap and an arcuate wall extending between the opposite end walls, the arcuate wall including a support rail for engaging the scroll near an end of the scroll opposite the retainer cap.

4. A single-use camera including an external housing, within the housing a camera frame having an exposure opening, a first chamber on one side of the exposure opening for receiving a light-tight film cartridge enclosing a filmstrip; and a second chamber on an opposite side of the exposure opening for receiving a scroll formed from a filmstrip, is characterized by:
   a removable retainer cap located and fixed against rotation in the second chamber for engaging an end of the scroll to prevent clock-springing of the scroll,
   wherein the retainer cap comprises:
   a base for engaging an end of the second chamber;
   abutment means supported by the base for engaging the end of the scroll to prevent clock-springing; and
   means for permitting a filmstrip to move past the abutment means during formation of the scroll and operation of the camera;
   wherein the abutment means comprises a curved wall extended outward from the base; and the means for permitting comprises an opening in the curved wall.

5. A single-use camera including an external housing, within the housing a camera frame having an exposure opening, a first chamber on one side of the exposure opening for receiving a light-tight film cartridge enclosing a filmstrip; and a second chamber on an opposite side of the exposure opening for receiving a scroll formed from a filmstrip, is characterized by:
   a removable retainer cap located and fixed against rotation in the second chamber for engaging an end of the scroll to prevent clock-springing of the scroll,
   wherein the retainer cap comprises:
   a base for engaging an end of the second chamber;
   abutment means supported by the base for engaging the end of the scroll to prevent clock-springing; and
   means for permitting a filmstrip to move past the abutment means during formation of the scroll and operation of the camera;
   wherein the abutment means comprises a plurality of segments extended outward from the base; and the means for permitting comprises an opening between a pair of the segments.

6. A single-use camera including an external housing, within the housing a camera frame having an exposure opening, a first chamber on one side of the exposure opening for receiving a light-tight film cartridge enclosing a filmstrip; and a second chamber on an opposite side of the exposure opening for receiving a scroll formed from a filmstrip, is characterized by:
   a removable retainer cap located and fixed against rotation in the second chamber for engaging an end of the scroll to prevent clock-springing of the scroll;
   the camera being further characterized in that the second chamber includes opposite end walls separated by a distance greater than a combined length of the scroll and the retainer cap and an arcuate wall extending between the opposite end walls, the arcuate wall including a support rail for engaging the scroll near an end of the scroll opposite the retainer cap.

* * * * *